United States Patent [19]

Mejia

[11] Patent Number: 4,522,900
[45] Date of Patent: Jun. 11, 1985

[54] BATTERY CELL

[76] Inventor: Santiago Mejia, 525 N. Ocean Blvd., Apt. 1024, Pompano Beach, Fla. 33062

[21] Appl. No.: 547,626

[22] Filed: Nov. 1, 1983

[51] Int. Cl.$^3$ .............................................. H01M 2/02
[52] U.S. Cl. ...................................... 429/181; 429/185
[58] Field of Search ................................ 429/181–185, 429/180, 176

[56] References Cited

U.S. PATENT DOCUMENTS

| | | | |
|---|---|---|---|
| 2,100,921 | 11/1937 | Rolph | 429/181 X |
| 3,968,022 | 7/1976 | Eng et al. | 429/180 X |
| 3,996,065 | 12/1976 | Trippe et al. | 429/183 X |
| 4,006,282 | 2/1977 | Antoine | 429/181 |
| 4,215,187 | 7/1980 | Gnida et al. | 429/181 X |
| 4,241,152 | 12/1980 | Klink | 429/181 |
| 4,245,014 | 1/1981 | Veit, Jr. et al. | 429/181 |
| 4,299,891 | 11/1981 | Mocas | 429/181 X |
| 4,347,294 | 8/1982 | Mejia | 429/160 X |

Primary Examiner—Charles F. LeFevour
Attorney, Agent, or Firm—Shlesinger, Arkwright, Garvey & Fado

[57] ABSTRACT

A battery cell has a casing and terminal seal construction which precludes leakage and plate and terminals which provide greater power and longer life.

10 Claims, 6 Drawing Figures

BATTERY CELL

BACKGROUND OF THE INVENTION

This invention relates to battery cells, and particularly to such cells that can be used as individual units of a larger composite battery.

An example of such a battery arrangement is shown in my U.S. Pat. No. 4,347,294, entitled "Novel Electric Storage Battery Assembly". This shows a plurality of battery cells interconnected to form a composite battery of the modular type.

The advantage of such types of battery arrangement lie in the ability to interconnect and replace individual cells as required.

The cell units presently in use, although providing adequate service, have construction draw backs that adversly effect the power output, and life of the cell unit. Also, the fabrication and manufacture for the currently used battery cell unit are relatively expensive.

SUMMARY AND OBJECT OF THE INVENTION

Accordingly, it is a principal object of this invention to provide an improved battery cell which has greater power and longer life.

Another general object of this invention is to provide battery cell that can more readily be manufactured.

It is a more specific object of this invention to provide improved battery cell elements which will contribute to greater power and longer life of the battery cell.

Another object of this invention is to provide an improved battery case which can be more readily manufactured.

It is a still further object of this invention to provide an improved battery cell terminal which has greater conductivity and is less subject to failure.

It is a still further object of this invention to provide a battery cell casing which is less subject to leakage.

It is a still further object of this invention to provide a battery cell which has better support for the battery plate assembly.

A still further object of this invention is to provide an improved type of plate construction which will more readily conduct electrical charges through the terminal.

These and further objects and advantages of the invention will become more apparent from the following description of the drawings and of the invention.

DESCRIPTION OF THE INVENTION

Figure 1:
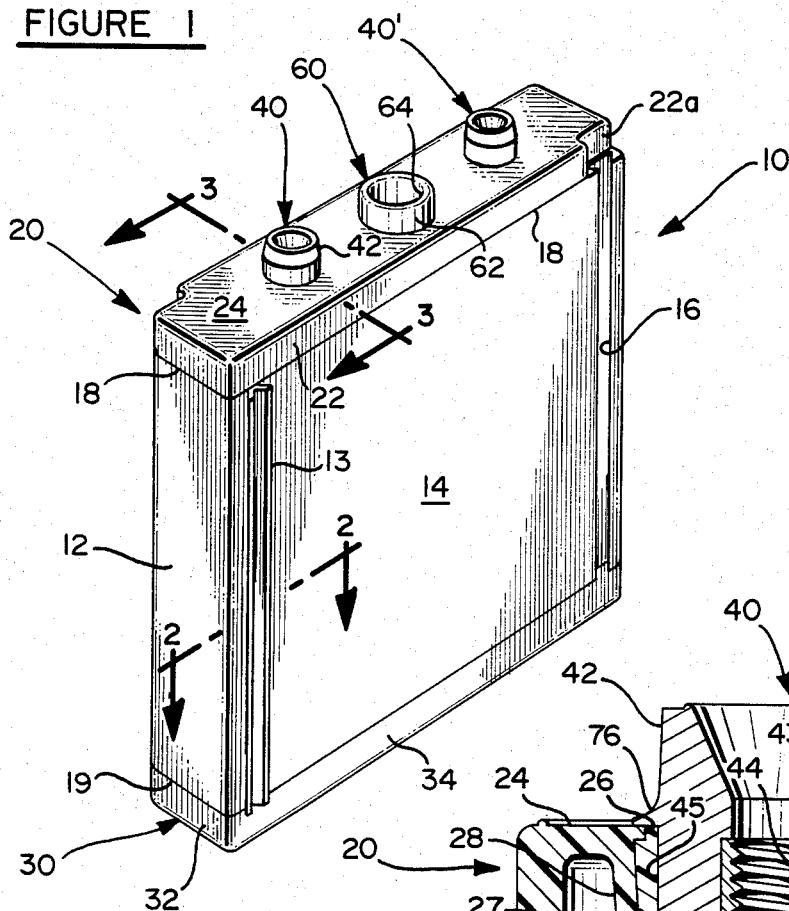
FIG. 1 is a perspective view of the battery cell.

Referring to FIG. 1, the battery case generally indicated at 10 has a central casing with narrow rectangular front and back panels 12, and wide side panels 14. Each side panel has a longitudinally extending connector member 13 integrally molded therewith adjacent one side of the panel, and a longitudinally extending groove or recess 16 adjacent the other side of the panel. A similar diametrically opposed matching connector and groove are disposed on the other side panel of the case, so that when individual separate cells are placed together they can readily be interfitted by sliding the second battery case downward along the connector member and groove of the first case until they are aligned with each other.

Figure 2:
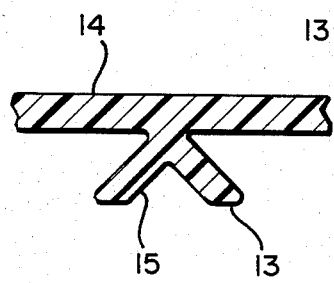
FIG. 2 is a section along Line 2—2 of FIG. 1.

FIG. 2 is a cross section showing the shape of the connector member 13, which is "V"-shaped in configuration with the apex 15 being integrally connected to the wall 14. The groove 16 is shaped to receive this construction. This is an improvement of a prior dovetail construction since the connector member has more flexure and will more readily fit into the longitudinal groove or recess 16 of the adjacent cell unit.

Figure 3:
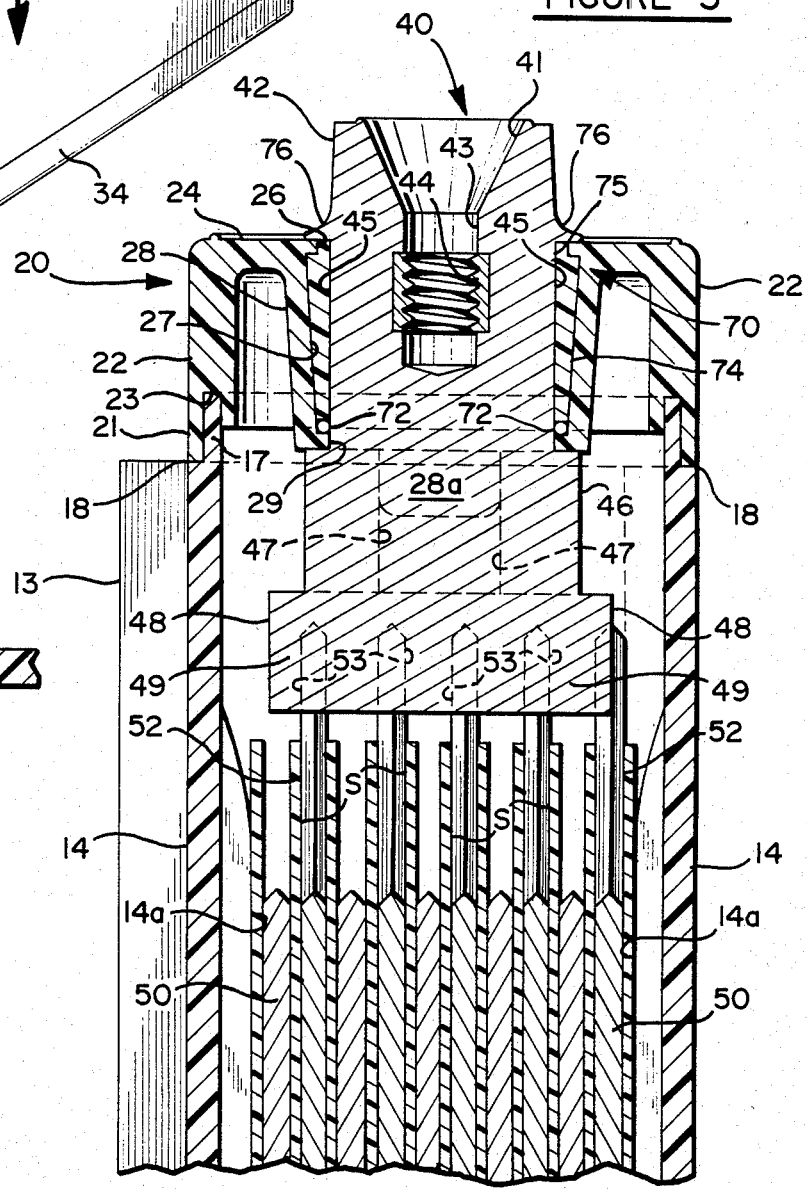
FIG. 3 is a partial cross section of the battery cell taken along Line 3—3 of FIGS. 1 and 4.

The upper periphery of the central battery cell casing has a shoulder 18 which extends around the entire periphery at the top thereof and as shown in FIG. 3 is the lower limit of an upwardly extending connecting lip 17. Internal battery plate assembly supporting ribs 14A extend inwardly from the inner surface of the side walls 14. A matching and similar type of construction is used at the bottom peripheral engaging end section at shoulder 19.

Both the top and bottom peripheral engaging end sections provide for a secure and readily bonded arrangement, usually by heating the plastic case and heat sealing the interfitting elements with the adjacent components. It should be noted that the central casing can readily be extruded with the groove and connector member.

Figure 4:
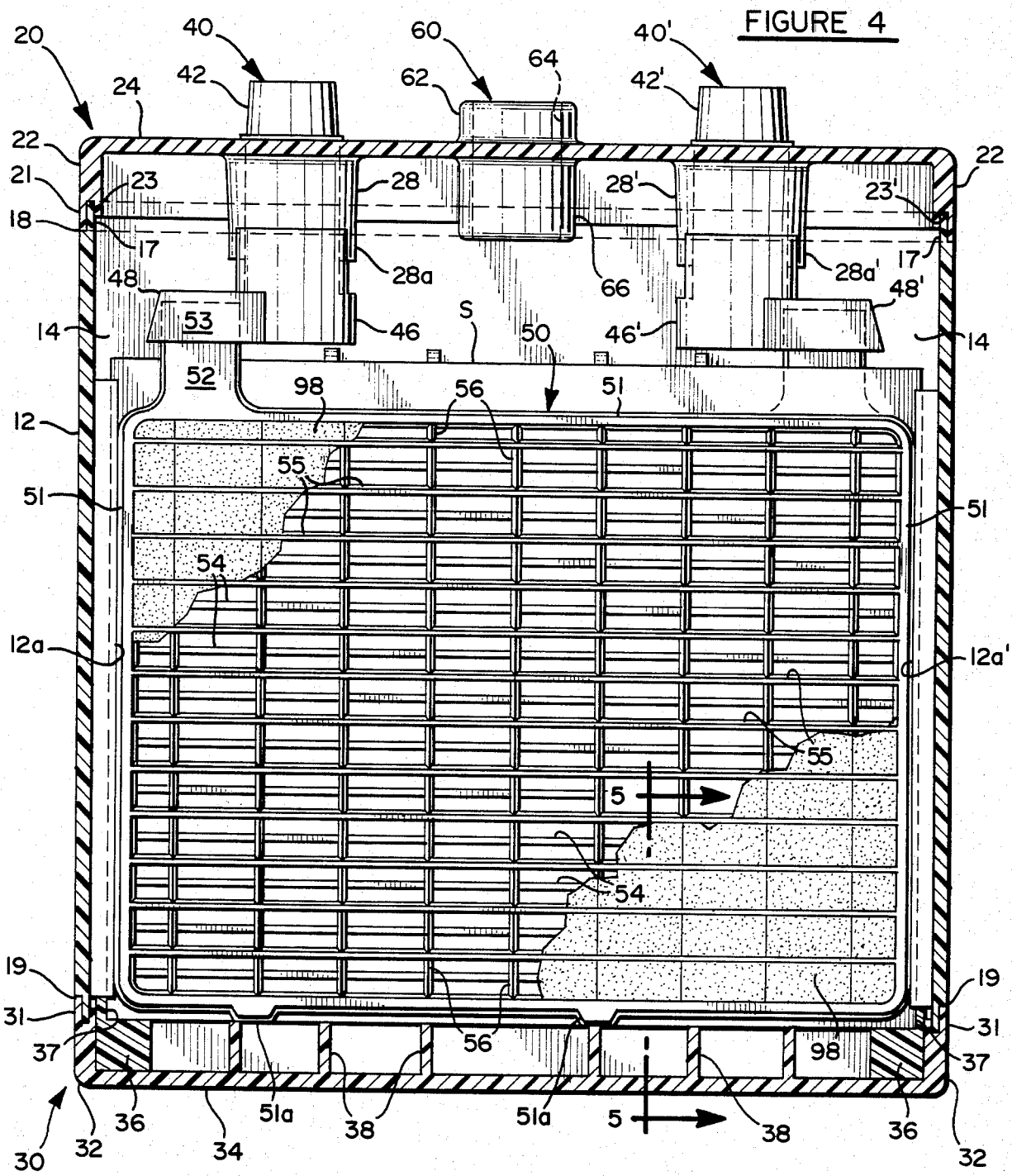
FIG. 4 is a sectional view of the battery casing taken along a line behind the side wall and showing the interior of the cell behind the side wall of the casing.

The casing top generally indicated at 20 has a depending side 22 which is accurately aligned with the central casing walls as shown in FIGS. 3 and 4. An overlapping and depending skirt 21 fits over and around the lip 17 and engages the shoulder 18. A double sealing effect results from the provision of a recess 23 in the depending wall 22 which receives the lip 17. When these surfaces are bonded together, there is very little possibility of leakage of fluid or gas from inside the cell. The top 20 has an opening which permits the terminals generally indicated at 40 and 40' to extend upwardly therethrough.

In FIG. 3, the detailed construction of the battery terminal receiving detail is shown for the battery terminal assembly generally indicated at 40.

It has a downwardly extending sleeve 28 with an internal bushing recess 27. At the top and bottom of the recess there are circular shoulders 26 and 29. The inner surface of the recess 27 tapers downwardly and inwardly to provide an enhanced sealing capacity, which will be discussed below.

The bottom of the casing generally indicated at 30 is an individual piece which has an upstanding side wall 32 and an outer upstanding skirt 31 with a recess into which the bottom periphery of the central casing is inserted, with the end of the skirt 31 engaging the shoulder 19. The arrangement of the elements are identical to those at the top peripheral end section described previously.

The bottom piece 30 has a bottom surface 34 with integrally molded upstanding plate and separator supporting ribs 38 as shown in FIG. 4. Plate assembly supporting blocks 36 are located at each corner of the bottom member 30. A cut-out section 37 conforming to the corners of the plate assembly receives the corners and holds them firmly.

The three piece casing unit provides the ability to use simple molded pieces, rather than a large molded piece if the bottom and side walls were molded as one complete piece. With respect to the connector strip, and the longitudinal recess 16, it should be noted that the top of the lid is off set at 22A to provide clearance for the open end at the top of the recess 16.

It is also possible to extend the connector strip and the recess in a horizontal, rather than vertical direction. However, if this is done, the elements could not be formed as part of the extruded central casing, but would be incorporated on a molded casing.

The terminal assembly generally indicated at 40 is shown in FIGS. 3 and 4. It has a central upper cylindrical body portion 42 which has an inwardly tapering conical central screw receiving piece 41 in line with a central bore within which a threaded nut 44 is disposed. The outer cylindrical surface 45 extends up through the sleeve 28 of the casing top. It has a central enlarged shoulder section 46 which is disposed in firm engagement with the lower shoulder 29 of the sleeve 28.

The sleeve 28 has a depending locking block 28A shown in shaded outline in FIG. 3 which extends downwardly into a slot 47 in the side of the terminal casting. There is a plug and interlocking structure on each side of the terminals.

A lower tab connecting foot 48 of the terminal interconnects electrically and physically the plates of the same polarity.

It should be noted that each plate generally indicated at 50 has an upstanding tab 52 the upper portion of which 53 is embedded within the terminal connecting foot 48. To provide for better electrical and physical capability the plate tabs 52 are integrally molded together in one operation in which the terminal or battery terminal 40 is molded. Both the shape of the terminal and the embedding of the battery plate tabs, as well as he embedding of the locking nut 44 are molded simultaneously. This provides one single solid terminal from bottom to top with no separate interface surfaces.

This is entirely different from the usual structure in which the terminal member is molded as a separate piece and then fused with a piece corresponding to the foot 48.

It has been found that this is possible, if the plates are stacked together in position and then inverted and placed with the tab extending downwardly into the top of an open cavity mold. The bottom of the mold is open, but is closed by a cone member conforming to the shape of the recess 41. At the apex of the cone there is a upstanding mandrel on which the threaded nut 44 is placed. The bottom of the mold is closed by moving the mandrel and nut with the cone-shaped member into position closing the bottom of the mold.

The lead is then poured into the mold to form a upper terminal portion 42 at the lower end of the mold and the foot 48 at the top of the mold which surrounds and solidifies around the tabs. When the has cooled sufficiently, the cone and mandrel are withdrawn from the bottom of the mold and the connected plates and terminal withdrawn from the top of the mold.

The manner in which the plate assembly is supported in the cell casing is shown in FIGS. 3 and 4. The stacked individual plates are arranged with plates of opposite polarity adjacent to each other and separated by a nonconducting separator which extends between and also beyond the periphery of the plates which they separate. The separator plates are made of non-conductive material, such as a paper product, and are all identical.

Figure 5:
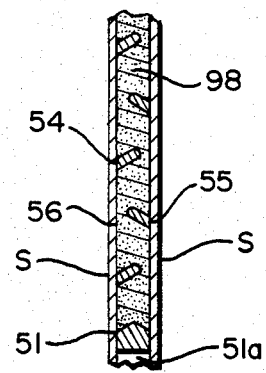
FIG. 5 is a sectional view taken along Line 5—5 of FIG. 4.

The plates of one polarity are connected to a terminal at one end of the cell, and the plates of the other polarity are connected to the terminal at the other end of the cell. The stacked plate and separator assembly is supported in the casing on the ribs 38 along their bottom edge, and by the plurality of vertical upwardly extending ribs 14A which extend along the interior of the side walls of the casing to engage the outermost separator of members. The ends of the separators are supported by a thin undulating insert strip 12A of generally sinusoidal longitudinal configuration with the one wave periphery extending across and engaging all of the separator plates, and the surface of the adjacent waves at their outer surface engaging the inside surface of the end wall 12, it is plastic material The battery plate 50 has a periphery 51 forming the rectangular outer perimeter to which the upstanding tab 52 is attached at an upper corner of the plate. Vertical retaining bars extending in a horizontal direction with one set of bars 54 at one side of the frame 51 and another set of bars 55 on the other side of the frame 51. They are downwardly enclined as indicated in the cross-sectional view of FIG. 5 to enhance the retaining of the powdered plate composition 58 which fills the entire area within the frame 51 and around the retaining crossbars. The cross bars are supported in a grid structure by vertical support bars 56.

The top of the battery casing has an opening filling assembly generally indicated at 60 which has an upper cylindrical flange 62 and a downwardly extending flange 66 which may be integrally molded with the top 20 of the casing it has a cylindrical through inner surface 64.

When the grid assembly is in position within the casing, and the top 20 mounted thereon the terminal assembly 40 extends upward through the assembly with the aligning lug 28A fitting within the slot 47 of the terminal. A previously inserted bushing assembly generally indicated a 40 consists of an "O" ring 72 which is mounted within the recess 27 as indicated in FIG. 3 and in contact with the lower shoulder 29. A cylindrical bushing 74 of nylon material is used as a sealer in addition to the "O"-ring and is inserted within the recess 27. A locking tool having a central threaded member not shown engages the nut 44 when the terminal 40 is to be locked in position. It has an annular inner surface which engages he outer surface of the terminal 42 and is of slightly less diameter, so that when the tool is pulled outwardly it pulls the shoulder of the lower portion of the terminal 46 up against shoulder 29 of the top and simultaneously squeezes the bushing 74 upwardly and around the slighty opening between the terminal and the shoulder 26 to provide a tight seal as the bushing is moved upwardly along the tapered recess surface 27. At the same time, the outer periphery of the terminal above the battery top is shaved and pressed downwardly to provide the sealing and locking fillet 76. Rotational movement is restricted by the slot 47.

Figure 6:
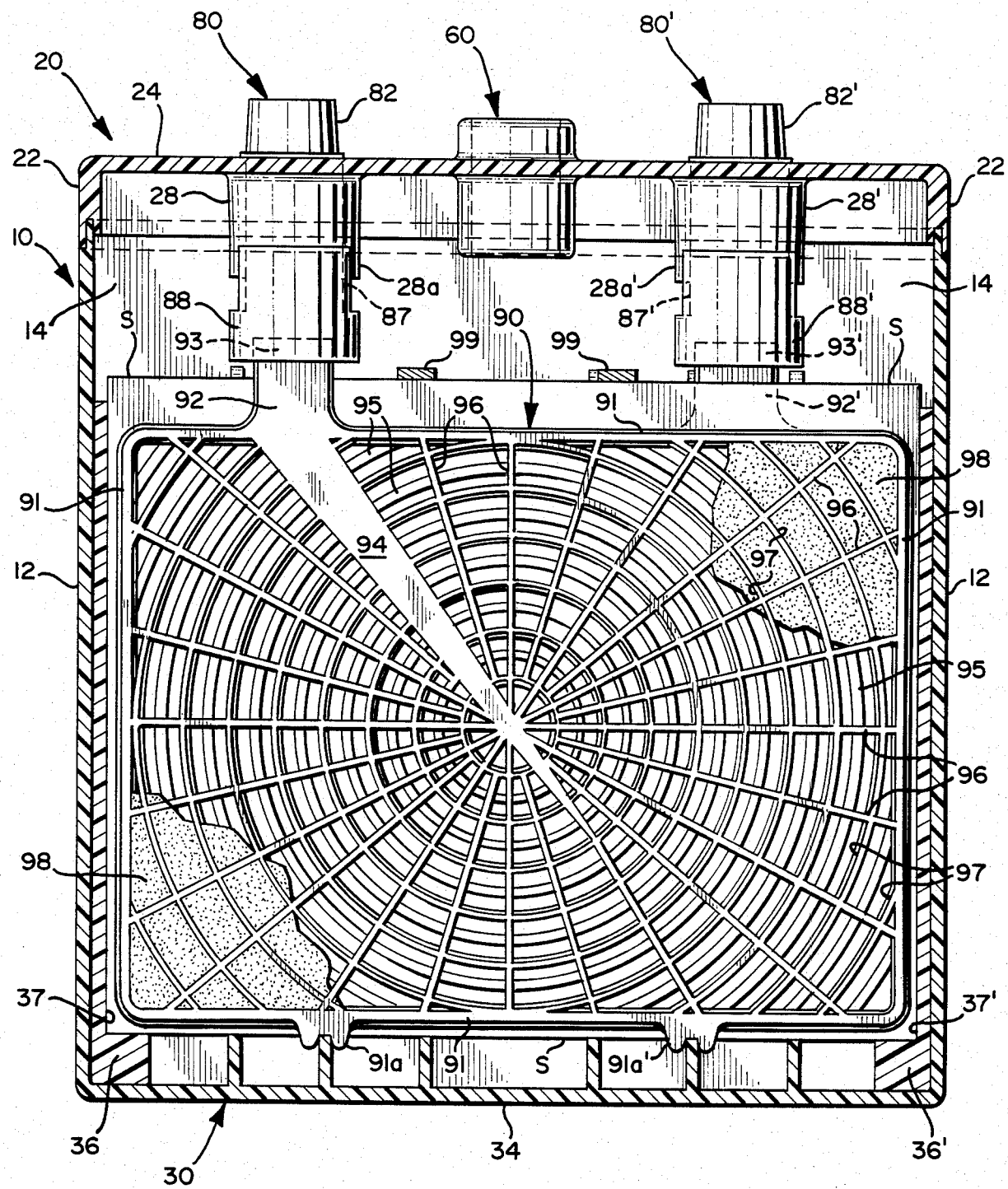
FIG. 6 is a view similar to FIG. 4 showing a different battery plate construction.

FIG. 6 shows another type of plate construction which has the advantage of better movement of plate current which is readily moved from the center of the plate outwardly to the terminal. The plate generally indicated at 90 has an outer frame 91 and upstanding tab 92 the upper portion of which 93 is embedded in the foot 88 of the terminal 86. The terminal construction generally indicated at 80 is similar to that of FIG. 3 at the upper end. However, it will be noted that the foot 88 is cast directly under the main portion 86 of the terminal to shorten the conductive path.

The shortening of the conductive path throughout the plate is of importance with respect to this plate construction. The plate current is removed from the central area by a conducting bus 94 which extends radially towards the center of the plate. It engages the circular and concentrically arranged retaining bars 95 and 97. They are supported by the radially extending support bars 96. The powered plate composition is applied to the plate filling the open areas of the concentric grid. The plate assembly is supported in the same fashion as the plate assembly shown in FIG. 4, except that the corner supporting block 36 and 36' extend upwardly along the side wall to support the whole side of the separator structure instead of using the sinusoidal wavelike retainer of FIG. 4.

The lower periphery of the grids have a downwardly extending bracket 91a which engage the upstanding ribs of the bottom of the case 30. The battery case of FIG. 6 has the sides and bottom molded integrally.

I claim:
1. A battery cell, comprising:
  (a) a battery case containing a plurality of battery plates and having a positive terminal and a negative terminal which extend through terminal receiving openings and are integral with the battery plates,
  (b) the battery case having a terminal receiving assembly for each terminal at the terminal receiving opening which includes and a depending flange which is concentrically disposed with respect to the terminal receiving openings with a compressible seal which is pressed into tight sealing engagement with the battery terminal at the time the terminal is mounted into the receiving assembly,
  (c) each terminal having an internal engaging element disposed along its central axis and accessible from the top of the terminal, and
  (d) the upper outer external surface of the terminals being pliable and forming a locking fillet which extends radially outwardly over the casing upper surface adjacent the opening such that the terminal is held in firm locking engagement with respect to the terminal receiving assembly when the terminal is pulled upwardly into final locking position by means of the grasping element.

2. A battery cell, comprising:
  (a) a battery case containing a plurality of battery plates and having a positive terminal and a negative terminal,
  (b) the battery case having a terminal receiving assembly which includes a compressible seal which is pressed into tight sealing engagement with the battery terminal at the time the terminal is mounted into the receiving assembly,
  (c) the terminal receiving assembly includes a downwardly and inwardly extending sleeve which has an internal bushing recess and upper and lower shoulders,
  (d) a compressible bushing disposed within the recess,
  (e) the battery terminal extending upwardly through the bushing and having a casing engaging section which engages the lower shoulder of the terminal receiving assembly, and a terminal seating means integrally connected with the terminal for permitting the terminal to be forcibly moved upwardly against the lower shoulder of the sleeve and to press and lock the bushing in tight sealing engagement with the adjacent surfaces of the sleeve and the terminal.

3. The battery cell as set forth in claim 2, wherein:
  (a) the bushing recess is tapered downwardly to impart a wedgelike action with respect to the bushing to bring it into tight sealing engagement.

4. The battery cell as set forth in claim 3, wherein:
  (a) the terminal has a mechanically engagable element which will permit a battery terminal to be drawn into tight engagement with the casing.

5. The battery cell as set forth in claim 4, wherein:
  (a) the battery terminal in locked sealing position has an integral fillet which engages the case and exerts locking pressure with respect to the terminal and the case while simultaneously sealing the area above the bushing.

6. The battery cell as set forth in claim 2, wherein:
  (a) the means includes a threaded member integral with the terminal, and
  (b) the terminal and the casing have interfitting elements which prevent relative rotation.

7. The battery cell as set forth in claim 6, wherein:
  (a) the interfitting elements include an outwardly extending locking member on one of the interfitting members, and
  (b) a receiving slot on the other of the members.

8. The battery cell as set forth in claim 2, wherein:
  (a) the casing exterior surface has a longitudinally extending "V" cross sectional configuration connector member integral with the casing outer surface and adapted to engage a coating element on the outer surface of an adjacent corresponding battery cell.

9. The battery cell as set forth in claim 2, wherein:
  (a) the battery plates have an upwardly extending tab which is integrally connected to the terminal,
  (b) the tab having a conducting bus which extends from the terminal to a central section of the battery plate.

10. A battery cell, comprising:
  (a) a battery case containing a plurality of battery plates and having a positive terminal and a negative terminal,
  (b) the battery case having a terminal receiving assembly which includes a compressible seal which is pressed into tight sealing engagement with the battery terminal at the time the terminal is mounted into the receiving assembly,
  (c) the plates have upwardly extending tabs, and
  (d) the terminals are a single piece of moldable metal each with a foot which extends down surrounding and embedding all of the tabs to provide a single uninterrupted conductive path.

* * * * *